Dec. 21, 1943.  H. D. GEYER  2,337,097
CLUTCH DRIVEN PLATE
Filed April 29, 1940
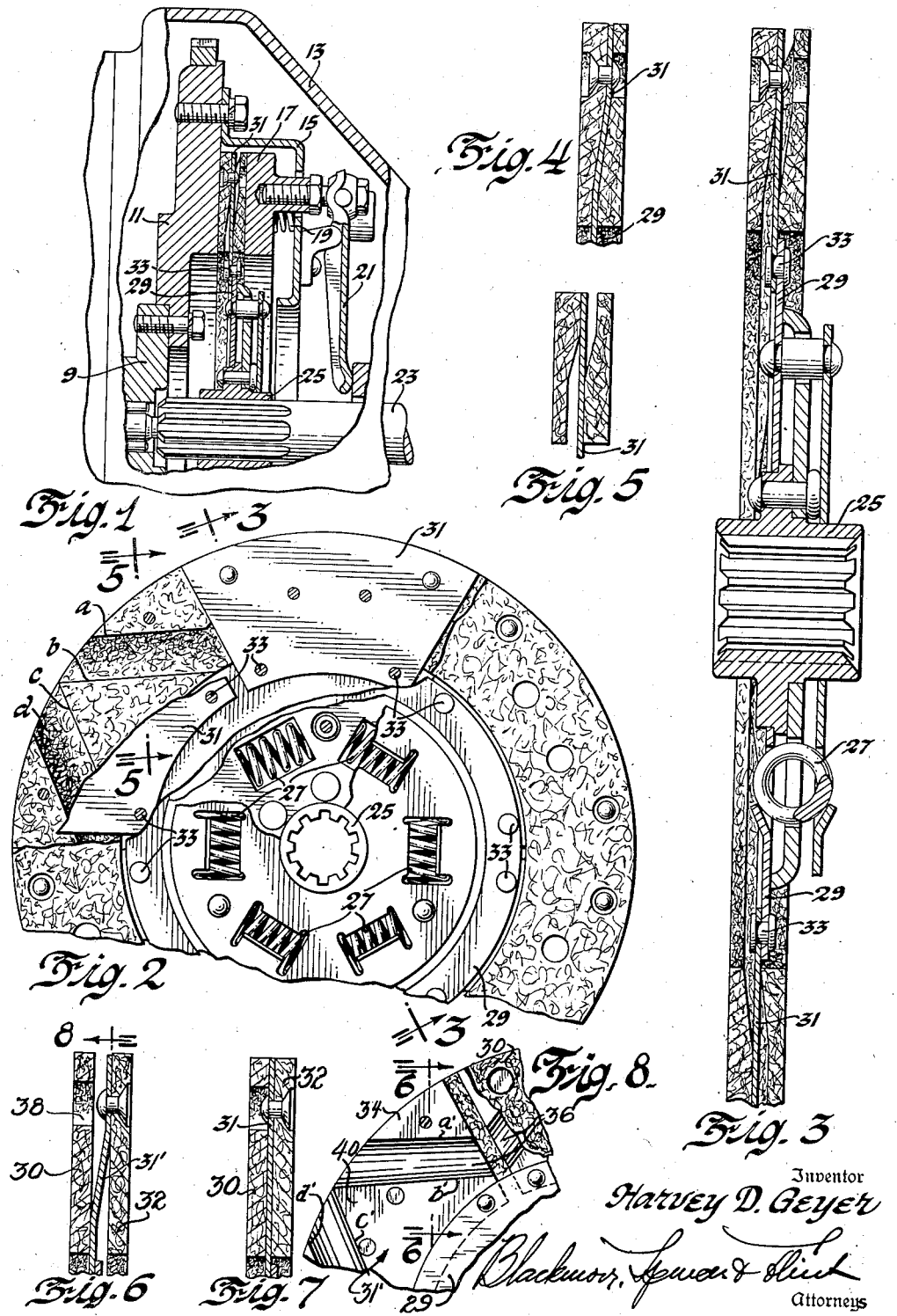
Inventor
Harvey D. Geyer
Blackmore, Spruce & Flint
Attorneys Patented Dec. 21, 1943

2,337,097

UNITED STATES PATENT OFFICE 2,337,097

CLUTCH DRIVEN PLATE

Harvey D. Geyer, Dayton, Ohio, assignor to General Motors Corporation, Detroit, Mich., a corporation of Delaware Application April 29, 1940, Serial No. 332,249

1 Claim. (Cl. 192—107)

This invention relates to friction clutches such as are used between the engine shaft of a motor vehicle and the input shaft of the change speed transmission.

An object of the invention is to obtain a smooth engagement as the driven member of the clutch is being forced into joint rotation with the driving member.

Other objects including simplicity and economy will be understood from the description which follows.

On the accompanying drawing:

Figure 1 is a transverse section of a clutch embodying my invention.

Figure 2 is a view in elevation partly broken away.

Figure 3 is a section on line 3—3 of Figure 2.

Figure 4 is a sectional view of a part of Figure 3, but showing elements of the clutch displaced to clutch engaging position.

Figure 5 is a section on line 5—5 of Figure 2.

Figures 6, 7 and 8 are views of a modified form.

Figure 6 is a section on line 6—6 of Figure 8.

Figure 7 is a similar view with the parts in clutch engaged relation.

Figure 8 is a view as seen from the line indicated on Figure 6 and in the direction of the arrow marked 8.

Referring by reference characters to the drawing, engine shaft 9 carries a flywheel 11 housed by a casing 13. A cover 15 houses a pressure plate 17 and serves as an abutment for springs 19 which press the pressure plate toward the flywheel. Conventional releasing means, including levers 21, serve to withdraw the pressure plate against the action of springs 19.

The driven shaft 23 carries the hub 25 of the driven disk. Suitable torque transmitting springs 27 serve to connect the hub with an intermediate plate 29. A plurality of resilient segments 31 are attached at 33 to the plate 29. These segments together form a divided resilient ring. Annular friction facings are provided on each side of the divided ring and attached to the several segments. The sides of the facings adjacent the ring are not flat throughout. Between diagonal lines $a$, $b$ the facings are sloping as shown by Figure 5. Beyond the lines $a$ and $b$ they are flat. The slope in the case of the opposed facings is opposite so that the plate is distorted when the clutch is engaged. The angular line of the sloping region has a circumferential component. Since the driven plate is forced into rotation when gripped between the rotating flywheel and pressure plate the circumferential component is more effective in giving a smooth non-grabby engagement than if the line of the sloping region were radial. For the reason that in clutch engagement there is a relative rotation of the driving members and the driven member about a central axis a circumferential slope is advantageous. With such a construction the steel segment bends in the direction of movement of the parts which cause its distortion. Sloping regions are also provided between lines $c$ and $d$ and similarly function as will be readily understood.

In Figures 6, 7 and 8 is shown a modification. In place of a normally flat steel plate 31 and deformed facings, as in the other figures, the facings are of uniform thickness and are marked 30 and 32. The steel plate 31' is normally distorted when the clutch is released, the distortion being such as to form flat parallel plane portions 34 and 40 and sloping portions marked 36. It will be seen by reference to Figure 8 that the boundary lines between the flat and sloping portions correspond to the boundary lines $a$, $b$, $c$, $d$ of Figure 2 and are marked $a'$, $b'$, $c'$, $d'$. The facings are formed with openings 38 to receive the rivets when the plate is flattened as is shown by Figure 7.

I claim:

In a clutch, a driven member having peripheral radially separated resilient segments forming an interrupted ring, friction facings attached to opposite surfaces of said segments, said facings having parallel flat portions and connecting sloping portions, the lines forming the boundaries between each sloping portion and the adjacent flat portions being parallel with each other and forming acute angles with radii and with tangents intersecting said boundary lines at their extremities.

HARVEY D. GEYER.